Aug. 18, 1970   D. L. BAKKER   3,524,557
SILAGE HANDLER WITH AUTOMATIC FILLING CONTROL
Filed May 14, 1968
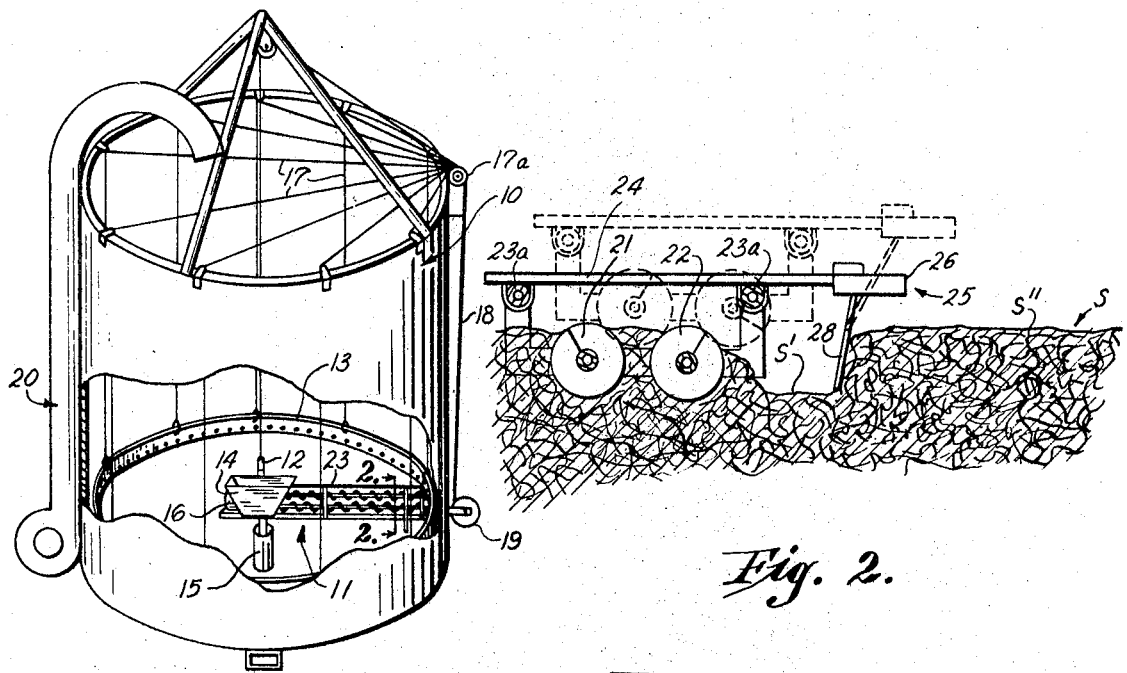
Fig. 1.
Fig. 2.
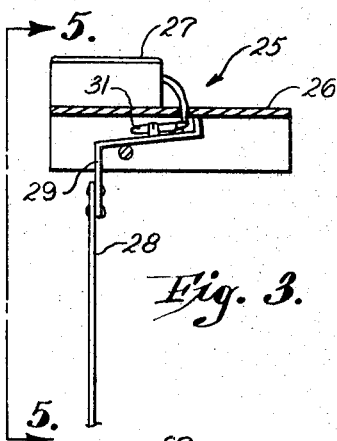
Fig. 3.
Fig. 5.
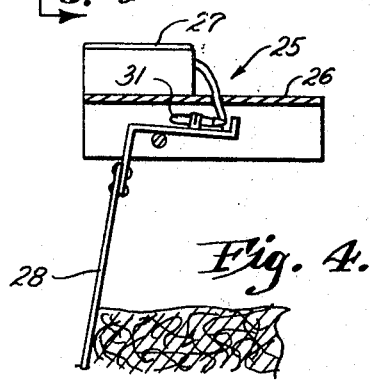
Fig. 4.
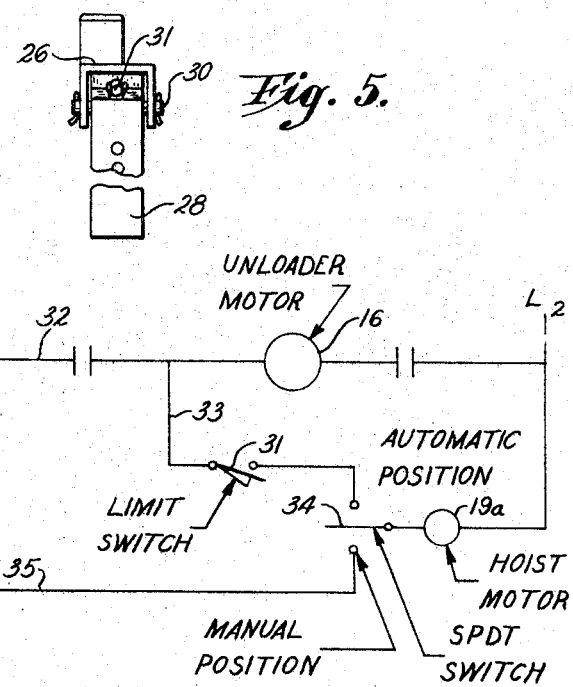
Fig. 6.
INVENTOR
Donavon L. Bakker
BY
Scofield, Kokjer, Scofield + Lowe
ATTORNEYS

United States Patent Office 3,524,557
Patented Aug. 18, 1970

---

3,524,557
SILAGE HANDLER WITH AUTOMATIC FILLING CONTROL
Donavon L. Bakker, Fort Atkinson, Wis., assignor to Butler Manufacturing Company, Kansas City, Mo., a corporation of Missouri
Filed May 14, 1968, Ser. No. 729,003
Int. Cl. B65g 65/32
U.S. Cl. 214—17          2 Claims

ABSTRACT OF THE DISCLOSURE

A sweep type silage conveyor within the silo is equipped with a silage level sensing control means which operates during filling to raise the conveyor automatically as the level of silage within the silo is raised.

BACKGROUND OF THE INVENTION

In silo unloaders of the type disclosed in Hazan Pat. 3,075,657, issued January 1963, and Zeiter Pat. 3,297,177, issued Jan. 10, 1967, the horizontal sweep conveyor within the silo is used during both filling and unloading. During filling, silage is normally fed into the center of the silo. The conveyor is operated to move silage outwardly toward the wall. To distribute the incoming silage uniformly around the interior of the silo, the conveyor is also rotated horizontally about the ecnter of the silo. Normally it is intended that silage be added in successive layers, one layer for each 360° sweep of the conveyor. Upon the completion of each layer, the unloader is raised to a proper elevation for forming the next layer.

Heretofore, the raising of the conveyor has been accomplished through manually operated controls upon reception by the operator of a signal indicating that it is time to raise the unit. One prior arrangement employed a paddle switch which would sense the completion of the layer, shut off the conveyor, and sound an alarm so that the operator could come and raise the unit. Another incorporated a centrifugal switch in association with the conveyor motor. As the conveyor motor slowed in response to overloading, the switch would open and effect ringing of an alarm bell indicating that it was time to raise the conveyor.

In both the above cases, the filling process was stopped completely when the conveyor had to be raised. The operator had to be in near attendance at all times and, if engaged in other tasks, to interrupt them to effect control of the unit. In the case of the centrifugal switch alarm, unless the operator responded promptly and stopped the conveyor motor, the conveyor would become covered with silage and subjected to potentially damaging loads.

SUMMARY OF THE INVENTION

The present invention provides apparatus which operates to effect automatic raising of the conveyor as the silo is being filled. In a preferred embodiment of the invention hereinafter described in detail, the hoist motor for the conveyor is automatically energized at the completion of each layer to raise the conveyor to the height necessary for starting the next layer of material. Control of the hoist operation is by means of a silage sensing element which moves in advance of the conveyor and upon sensing a higher level, which normally occurs at the start of a layer, operates the hoist motor to raise the conveyor until the sensing member is again free of restraint by the silage. Rotation of the conveyor then continues during formation of the next layer and the process is repeated at the completion of that layer and the start of the next one.

The invention also includes means by which operation of the hoist can be controlled manually or automatically, depending on the wishes of the operator.

As will undoubtedly be readily perceived, the main advantages of the invention are that the necessity of having an operator in close attendance during filling is removed and the possibility of damage to the equipment by overloading is eliminated. In addition, better control of the conveyor position within the silo for formation of the successive layers is obtained, thereby promoting more uniform filling.

Other and further objects of the invention, together with the features of novelty appurtenant thereto, will appear in the course of the following description.

DETAILED DESCRIPTION

In the accompanying drawing which forms a part of the specification and is to be read in conjunction therewith, and in which like reference numerals indicate like parts in the various views;

FIG. 1 is a largely schematic perspective view showing a silo equipped with a silage handler of the type which is used both during filling of the silo and unloading;

FIG. 2 is a greatly enlarged sectional view taken generally along the line 2—2 of FIG. 1 and showing a silage bed in association with the conveyor;

FIG. 3 is an enlarged sectional view of the silage sensing member, its support and the switch mounted on the member;

FIG. 4 is a view similar to FIG. 3, but illustrating the switch in the position corresponding to energization of the hoist;

FIG. 5 is a view taken generally along the line 5—5 of FIG. 3, the break lines indicating interrupted length; and FIG. 6 is a diagrammatic view of the electrical system through which control of the hoist and unloader motors is effected.

Referring now to the drawing, reference numeral 10 indicates generally a typical silo which is equipped with a silage handling apparatus of the type generally disclosed in the Hazen Pat. 3,075,657 or the Zeiter Pat. 3,297,177. The handler includes the twin auger conveyor 11 which is supported at its inward end from the suspension means 12 and at its outer end by a traction ring 13. A silage receiving open bottom hopper 14 is located at the inner end of the conveyor and also is suspended by the suspension system. A channel forming member 15 is located below the inner end of the conveyor. As can be seen by referring to the foregoing patents, as the silo is filled this channel former 15 serves to form a continuous vertical opening in the center of the silage which is utilized during the unloading operation. The details of how this is accomplished can readily be determined from the foregoing patents and will not be described further here. The drive motor for the conveyor augers of the conveyor 11 is indicated at 16, and preferably this is an electric motor which is wired into the system as indicated in FIG. 6.

As can be determined from the foregoing patents, the motor 16 serves to drive the radially extending augers which form a part of the conveyor; it also, through mechanism not shown in this application, but described in the Hazen patent, can serve to drive a sprocket which engages in the perforations in the ring 13 to rotate the conveyor horizontally within the silo. In other words, the conveyor 11 sweeps about the inside of the silo on the axis defined by its central suspension 12. Alternatively, a second motor (as shown in Zeiter) can be employed to provide a sweep drive controlled independently of the augers.

In the illustrated embodiment, the motor 16 is preferably a reversible motor which can effect rotation of the augers either in a direction to move material outwardly or inwardly. Since we are concerned only with the filling operation in this application, the motor is set to rotate the augers in a direction which will cause material to move outwardly from the hopper 14 toward the silo wall. Rotation of the conveyor 11 about the suspension 12 can be in either direction; in the illustrated embodiment, I have set it up as rotating clockwise during the filling operation.

The ring 13 and suspension 12 are supported by a plurality of cables 17 which extend to the top of the silo and are guided by appropriate guides toward a collecting pulley 17a where they join with a cable 18 which is wrapped on the drum of a hoist 19. The hoist 19 is electrically powered by an appropriate motor which is also shown in the diagrammatic showing of the diagram forming FIG. 6.

On the opposite side of the silo from hoist 19, I have shown a silage conveying unit 20 of conventional construction which operates to receive silage at its lower end and to impel it upwardly and into the silo and serves to direct it downwardly in the silo toward the hopper 14.

The twin augers of the conveyor 11, which in FIG. 2 are identified at 21 and 22, are supported in a frame 23 which may be constructed as disclosed in the aforesaid Hazen and Zeiter patents. This frame includes a pair of radially extending pipe-like structurals 23a.

Mounted on these structurals 23a near the outer end of the conveyor 11 is a transversely extending arm 24. In the illustrated embodiment, the arm 24 is connected with the frame by U-bolts, although other fasteners may be employed. The arm 24 is of sufficient length as to have a portion projecting forwardly of the extremities of the frame and on this forwardly projecting portion is mounted the control operating assembly 25 which is detailed in FIGS. 3, 4 and 5.

Basically, the control operating assembly includes a channel member 26 which is mounted on the end of the arm 24. Mounted on top of the channel is a junction box 27 containing suitable electrical connectors. The channel serves as a support for a pivotal depending arm 28 which serves as the silage level sensing member of the apparatus.

The arm 28 is connected with a generally Z-shaped support member 29 which in turn is welded or otherwise securely fastened to a pivot pin 30 having its opposite ends journaled in registering apertures in the side walls of the channel 26. A limit switch 31 is mounted on top of the member 29. In the preferred embodiment, switch 31 is a mercury switch. The leg 29a of the Z-shaped member serves as a stop which engages the underside of the web of the channel 26 and operates to prevent counterclockwise motion of the arm 28 beyond a position in which it is substantially vertical. It will be noted that the Z-shaped member 29 is so formed that when the member 28 is vertical, as shown in FIG. 3, the switch is inclined or tilted so that its left end is slightly down. This corresponds to a deenergized condition for the hoist motor 19a, as will subsequently be explained.

Referring to FIG. 6, the switch 31 is connected in a circuit between lines L–1 and L–2, which includes the conductors 32, 33, the single pole double throw switch 34, and the hoist motor 19a. Another terminal of the single pole double throw switch is connected between L–1 and L–2 by a conductor 35 and motor 19a.

In operation of the preferred embodiment, the switch 34 is set at the automatic condition. Silage (not shown in FIG. 1) is introduced to the interior of the silo through the filling mechanism 20. As earlier pointed out, it is directed downwardly toward the center of the silo and into the open bottom hopper 14 which serves to channel it toward the augers of the conveyor 11. The augers in turn convey the material outwardly. Since the conveyor 11 is also being rotated in a horizontal direction, material will be spread around the full area of the silo by a 360° sweep of the conveyor.

In FIG. 2, I have shown a silage pack S in which the level of one layer is indicated at S'. The layer on top of it is indicated at S''. The condition of the unit as illustrated in FIG. 2 is such that the conveyor is just arriving at completion of a full 360° sweep and thus the formation of a layer between S' and S''.

During the travel around the silo, the arm 28 will hang in the vertical position illustrated in FIG. 3 and switch 31 will thus remain open, thereby deenergizing the hoist motor. As the conveyor approaches the end of the sweep which is that condition illustrated in FIG. 2, the arm 28 engages the starting edge of the layer S'–S'', and as the conveyor continues to advance, the arm is deflected toward the conveyor, or toward the position illustrated in FIG. 4. This has the effect of reversing the inclination of the switch 31 and as this occurs the hoist motor 19a is energized, thereby lifting the conveyor and its associated apparatus. The hoist motor will remain energized until the conveyor has been raised sufficiently that the lower end of arm 28 rises above the surface S'', whereupon the arm will return to the position 28 (by virtue of the fact that its moment counterclockwise about the pin 30 is greater than the clockwise moment caused by the weight of the switch and its associated support). As this occurs, switch 31 is opened and the hoist motor is deenergized. The conveyor will therefore continue its sweep on around the silo distributing the silage in a new layer. It will be evident that the last incremental space in the layer which is present when the switch is energized will be filled by continued rotation of the auger during elevation by the hoist means.

It will be understood that if settling or other conditions occur which establish a mound or area of increased elevation at other locations during sweep, encounter of this by arm 28 will cause the same lifting action. It will also be understood that where a separate sweep motor is provided, it is this motor which will be controlled.

The electrical lines can be arranged in any suitable fashion. Normally, they are all associated into a common flexible conduit which is led upwardly over the top of and out of the silo. Inasmuch as this is conventional practice, I have not shown it in detail.

In the event it is desired to control the operation of the unit through manual means, the single pole, double throw switch is placed in the manual position of FIG. 6. Thereupon the conventional manual on-off controls (not shown) can be employed to effect operation of the motors. The arrangement is such that whether the unit is on automatic or manual, the unloader motor is driven independently of the hoist motor.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. In silage handling apparatus for operation in an upright silo having means for delivering silage into the silo and including a positively advanced horizontal sweep conveying means operable during filling to rotate about the center of the silo and convey incoming silage outwardly from the center of the silo toward the wall thereof, suspension means supporting said conveyor for rotation in a substantially horizontal direction within the silo whereby to distribute incoming silage within the silo about the axis of rotation of said conveying means, and power means associated with the suspension means and operable to raise said conveying means during filling and lower it during unloading, the improvement comprising, automatic control means for said power means, including a silage level sensing member rotatable with said conveyor, said sensing member comprising a pivotal arm having its free end positioned ahead of the conveying means in the direction of advance of the latter and engageable with a mound of silage in front of the conveying means, the pivot axis of said sensing member being substantially parallel with the conveying means and normal to the direction of travel of the conveying means, means supporting said arm from the conveyor, said control means actuated in response to pivoting of said arm upon engagement with said mound of silage and operable to operate said power means automatically and periodically to incrementally raise said conveying means as said silo fills with said silage.

2. The improvement as in claim 1, including manually operated control means for effecting operation of said power means, and selector means operable to provide for selection between said manually operated and said automatic control means.

References Cited

UNITED STATES PATENTS

| 3,204,786 | 9/1965 | Kucera | 214—17 |
| 3,438,517 | 4/1969 | Steffen | 214—17 |

ROBERT G. SHERIDAN, Primary Examiner